US008049392B2

(12) United States Patent
Quail et al.

(10) Patent No.: US 8,049,392 B2
(45) Date of Patent: Nov. 1, 2011

(54) PIN-STYLE COLLECTOR BRUSH HOLDER WITH ROTATING SPRING PLATE, RADIAL CONTACT, AND BRUSH-WEAR INDICATOR

(75) Inventors: Paul August Quail, Ballston Lake, NY (US); Albert Eugene Steinbach, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/652,084

(22) Filed: Jan. 5, 2010

(65) Prior Publication Data

US 2011/0163628 A1 Jul. 7, 2011

(51) Int. Cl.
*H02K 15/00* (2006.01)
*H02K 13/00* (2006.01)

(52) U.S. Cl. ........ 310/241; 310/240; 310/244; 310/245; 310/246; 310/247

(58) Field of Classification Search .................. 310/240, 310/241, 244–247
See application file for complete search history.

(56) References Cited

U.S. PATENT DOCUMENTS

| | | | | |
|---|---|---|---|---|
| 3,432,708 | A | 3/1969 | Bissett | |
| 3,710,478 | A | 1/1973 | Krulls et al. | |
| 3,864,803 | A | 2/1975 | Ohmstedt et al. | |
| 3,968,391 | A | 7/1976 | Blank | |
| 4,296,346 | A | 10/1981 | Ooki et al. | |
| 4,329,611 | A * | 5/1982 | Ohmstedt et al. | 310/227 |
| 4,663,552 | A | 5/1987 | Ohmstedt | |
| 4,739,208 | A | 4/1988 | Kimberlin | |
| 5,043,619 | A | 8/1991 | Kartman, Jr. | |
| 5,256,925 | A | 10/1993 | Cutsforth | |
| 6,873,083 | B2 * | 3/2005 | Ko et al. | 310/233 |
| 7,122,935 | B2 | 10/2006 | Custforth et al. | |
| 7,218,028 | B2 | 5/2007 | Annis et al. | |
| 7,365,470 | B1 * | 4/2008 | Eger et al. | 310/240 |
| 2003/0151328 | A1 | 8/2003 | Cutsforth et al. | |

FOREIGN PATENT DOCUMENTS

| | | | |
|---|---|---|---|
| DE | 4241404 | A1 | 6/1994 |
| WO | 95/08855 | A1 | 3/1995 |

OTHER PUBLICATIONS

Great Britian Search Report issued in connection with corresponding British Application No. GB1021706.5, Apr. 20, 2011.

* cited by examiner

*Primary Examiner* — Quyen Leung
*Assistant Examiner* — Terrance Kenerly
(74) *Attorney, Agent, or Firm* — Cantor Colburn LLP

(57) ABSTRACT

An apparatus for holding a brush in contact with a moving conductive surface, the apparatus includes: a rotatable member disposed adjacent to the brush; and a spring coupled to the brush and to the member and configured to bias the brush towards the moving conductive surface; wherein the rotatable member in a first position makes contact with the brush to secure the brush from movement and in a second position releases the brush from the contact to allow the spring to hold the brush in contact with the moving conductive surface.

19 Claims, 8 Drawing Sheets

PIN-STYLE COLLECTOR BRUSH HOLDER WITH ROTATING SPRING PLATE, RADIAL CONTACT, AND BRUSH-WEAR INDICATOR

BACKGROUND OF THE INVENTION

The present invention relates to a brush holder assembly for conducting electrical current between a brush and a rotating element of a dynamoelectric machine. In particular, the brush holder assembly can be replaced during operation of the machine.

A dynamoelectric machine has a rotor with windings that conduct electrical current for operation of the machine. Because the rotor rotates, rotating elements are used to conduct current to the rotor windings from a source external to the rotor. The rotating elements such as collector rings or commutators make contact with brushes to conduct the current. As the brushes are stationary with respect to the rotating elements, the brushes, which are made of carbon, wear due to friction and need periodic replacement.

Commercial electric generators are expensive to operate and need to generate revenue to support operations. Hence, a major goal in operating the generator is to reduce downtime for maintenance. To this end, the brushes are designed to be replaced while the generator is operating. As the generator is operating during brush replacement, safety is of the utmost concern.

In order to safely change the brushes, an operator uses only one hand. Using two hands increases the probability of an accident with current flowing from one hand to another hand through the operator's body. Even with appropriate protective personnel equipment, using only one hand is very important to reduce the risk of serious injury.

Older brush holder designs for replacing the brushes while the generator is operating have some drawbacks. For example, one type of brush holder weighs about ten pounds making it difficult for the operator to change out using only one hand. There are both ergonomic and safety concerns with this design. Also, while the brush surfaces are exposed to cooling air, it is difficult to see the amount of brush wear in order to determine an appropriate time for brush replacement.

As another example, other brush holders are somewhat lighter at five pounds but still too heavy to be conveniently changed out with only one hand. These brush holders are generally complicated and expensive. In addition, these brush holders use a box-style enclosure around each brush. Unfortunately, the box-style enclosure limits the amount of brush surface exposed to cooling air, thus, shortening the life span of the brush.

Some of the brush holders with the box-style enclosures hold only a single brush, which means the operator must reach into the energized brush-rigging/collector assembly for brush changing twice as many times as a two-brush holder design. In addition, it is difficult to see the amount of brush wear using the box-style enclosure design. One box-style holder design uses a wear indicator attached to each individual brush, increasing the cost of each brush and, therefore, maintenance costs.

Therefore, what are needed are techniques that allow changing brushes in a dynamoelectric machine safely, quickly, and inexpensively. In particular, the brush changing needs to be performed while the machine is operational.

BRIEF DESCRIPTION OF THE INVENTION

Disclosed is an embodiment of an apparatus for holding a brush in contact with a moving conductive surface, the apparatus includes: a rotatable member disposed adjacent to the brush; and a spring coupled to the brush and to the member and configured to bias the brush towards the moving conductive surface; wherein the rotatable member in a first position makes contact with the brush to secure the brush from movement and in a second position releases the brush from the contact to allow the spring to hold the brush in contact with the moving conductive surface.

Also disclosed is a dynamoelectric machine that includes: a conductive surface configured to move during operation of the machine; a brush configured to contact the conductive surface to conduct electric current; and a brush holder configured to hold the brush in contact with the conductive surface, the brush holder having: a rotatable member disposed adjacent to the brush; and a spring coupled to the brush and to the member and configured to bias the brush towards the conductive surface; wherein the rotatable member in a first position makes contact with the brush to secure the brush from movement and in a second position releases the brush from the contact to allow the spring to hold the brush in contact with the conductive surface.

Further disclosed is a dynamoelectric system that includes: a dynamoelectric machine; a conductive surface disposed at the machine and configured to move during operation of the machine; a brush configured to contact the conductive surface to conduct electric current; and a brush holder configured to hold the brush in contact with the conductive surface, the brush holder having: a rotatable member disposed adjacent to the brush; and a spring coupled to the brush and to the member and configured to bias the brush towards the conductive surface; wherein the rotatable member in a first position makes contact with the brush to secure the brush from movement and in a second position releases the brush from the contact to allow the spring to hold the brush in contact with the conductive surface.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings, wherein like elements are numbered alike, in which:

The detailed description explains embodiments of the invention, together with advantages and features, by way of example with reference to the drawings.

DETAILED DESCRIPTION OF THE INVENTION

Disclosed are techniques that allow changing brushes in a dynamoelectric machine safely, quickly, and inexpensively while the machine is operational. The techniques, which include apparatus and method, call for a brush holder assembly that is lightweight at approximately two and a half pounds in one embodiment. The lightweight allows an operator to lift and install the brush holder assembly without struggling due to heavy weight. In addition, the lightweight allows for more precise handling and positioning of the brush holder assembly resulting in increased safety.

The brush holder assembly includes features designed to make the brush change out quick and inexpensive. One feature provides an interface between the brush holder assembly and the machine that quickly secures the brush holder to the machine with a turn of a removable handle. Besides securing the brush holder assembly to the machine, turning the handle also releases the brushes to allow them to make contact with a rotating element (i.e., moving conductive surface) such as a slip ring referred to herein as a collector ring. When removing the brush holder assembly having worn brushes, a turn of the handle also secures the worn brushes to the brush holder for secure removal without the remnants of the brushes dangling or dropping from the holder.

To lessen the probability of an accident, in one embodiment, the brush holder assembly holds at least two brushes and the brush holder assembly includes a brush wear indicator that indicates the wear of the at least two brushes. To reduce maintenance cost, the wear indicator is part of the brush holder assembly and is not part of each individual brush. The wear indicator provides the operator with a direct indication of the amount of wear of the brushes in the brush holder assembly and eliminates any guessing with regards as to when the brushes need to be changed out. Both of these features reduce the frequency of the operator reaching into the area of the energized brushes.

To prevent premature wear of the brushes, the brushes are not enclosed in a box-style enclosure. Instead, the brush holder assembly includes pins around which the brushes slide and are guided towards the collector rings. By not being enclosed, an adequate amount of surface of each brush is exposed to cooling air to keep the temperature of each brush in an appropriate range. In addition, use of the pins lessens the weight of the brush holder assembly especially when compared to a box-style enclosure for holding a brush.

Figure 1:
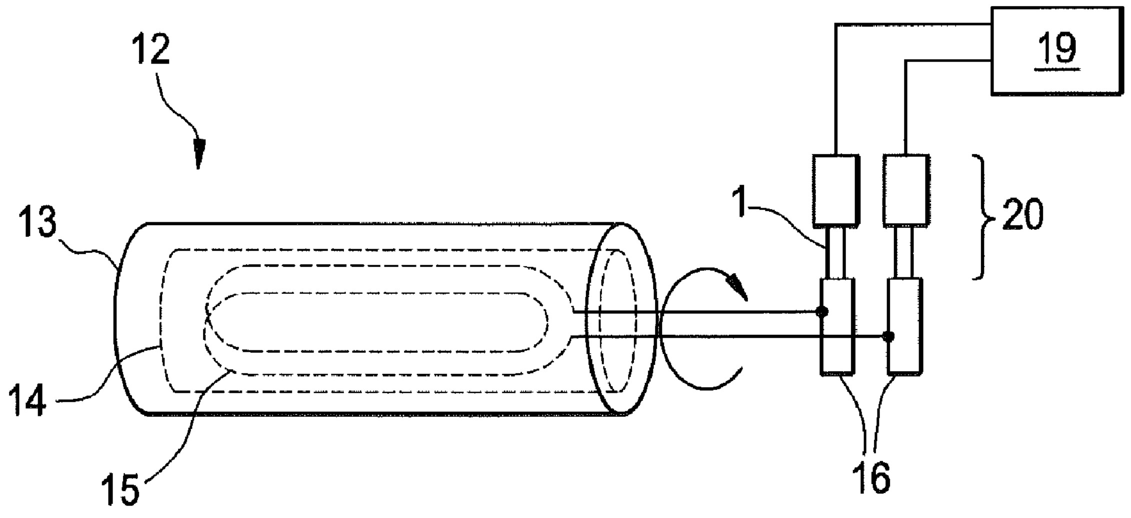
FIG. 1 illustrates an exemplary embodiment of a dynamoelectric machine with a brush holder assembly.

Reference may now be had to FIG. 1. FIG. 1 illustrates an exemplary embodiment of a dynamoelectric machine 12. The machine 12 refers to any generator and/or a motor operating with alternating current (AC) or direct current (DC). For purposes of discussion, the machine 12 is described as an AC generator. The machine 12 includes a stator 13 and a rotor 14 having windings 15. To generate electricity, the windings are energized with direct current from an external source 19. The DC current is conducted from the external source 19 via a conduction path that includes brushes 1 and collecting rings 16. The collecting rings 16 rotate with the rotor 14 and make contact with the brushes 1, which are stationary with respect to the collecting rings 16. The brushes 1 are held in place by a brush holder assembly 20. Because of the high current required by the windings 15, more than one brush 1 may be used for each collector ring 16. For purposes of discussion, the brush holder is presented as being configured to hold two brushes.

Figure 2:
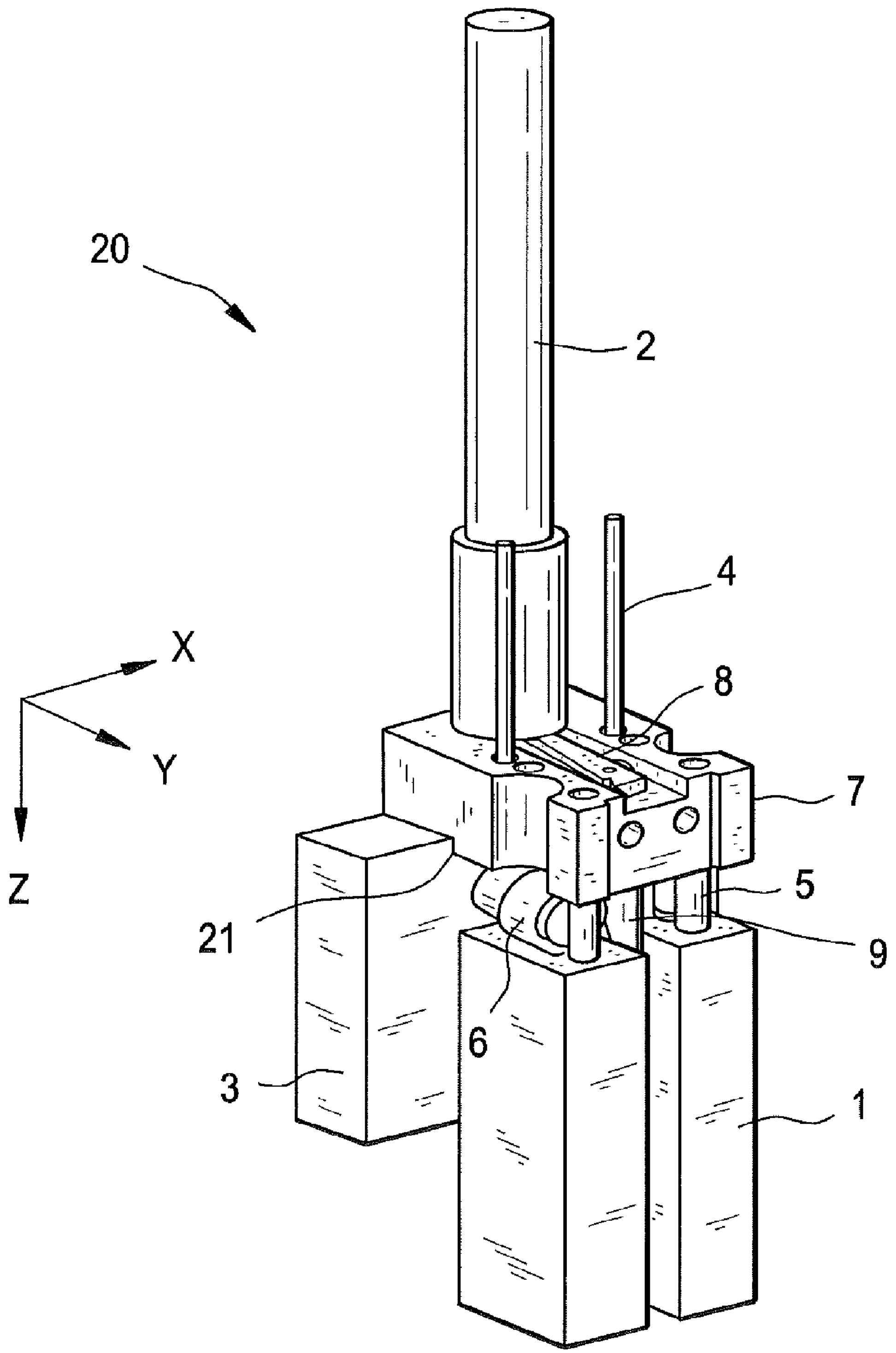
FIG. 2 depicts aspects of the brush holder assembly with a three-dimensional (3D) view.

Reference may now be had to FIG. 2. FIG. 2 depicts aspects of the brush holder assembly 20 with a three-dimensional (3D) view. The brush holder assembly 20 includes a body 7 having pins 5 extending toward the collecting rings 16. Brushes 1 have holes configured to accept the pins 5. The brushes 1 are configured to slide along the pins 5 and be guided toward the collecting rings 16 (along the Z-axis). The pins 5 restrain the brushes 1 in the X and Y plane. Disposed on each brush 1 between each brush 1 and the body 7 is a spring 6. The end of each spring 6 is attached to the distal end of a spring plate 9. When the end of the spring 6 is extended, the spring 6 is put into tension applying a force to the brush 1 forcing the brush 1 towards the associated collecting ring 16 along the Z-axis. The spring plate 9 opposite of the distal end is coupled to the body 7 and configured to rotate through a limited arc in the X-Y plane. A linkage 8 is coupled to the spring plate 9 at the body 7. Movement of the linkage 8 causes the spring plate 9 to rotate. As shown in FIG. 2, the spring plate 9 extends along the Z-axis between the two brushes 1.

Still referring to FIG. 2, a handle 2 is removably attached to the body 7. The body 7 is configured to interlock with a support 3 using the handle 2. The support 3 is configured to be attached or anchored to a structure adjacent to the collecting rings 16. Thus, the body 7 having brushes 1 that are worn can be removed from the support 3 using the handle 2. The worn brushes 1 can be replaced with new brushes 1 and the body 7 can be re-attached to the support 3. Upon re-attachment, the brush holder assembly 20 is configured to allow the new brushes 1 to make contact with the associated collecting ring 16.

Still referring to FIG. 2, the brush holder assembly 20 includes a brush wear indicator 4 coupled to each spring 6. Thus, as the brush 1 wears and is pulled by the spring 6 towards the associated collecting ring 16, the spring 6 attached to the brush 1 also moves towards the collecting ring 16 along with the brush wear indicator 4. The brush wear indicator 4 extends through the body 7. In one embodiment, the brush wear indicator includes markings that when lined up with the body 7 indicate an amount of brush wear. In another embodiment, the length of the brush wear indicator 4 is configured so that the end of the indicator 4 is flush with the body 7 when the brush 1 is worn and in need of replacement.

Figure 3:
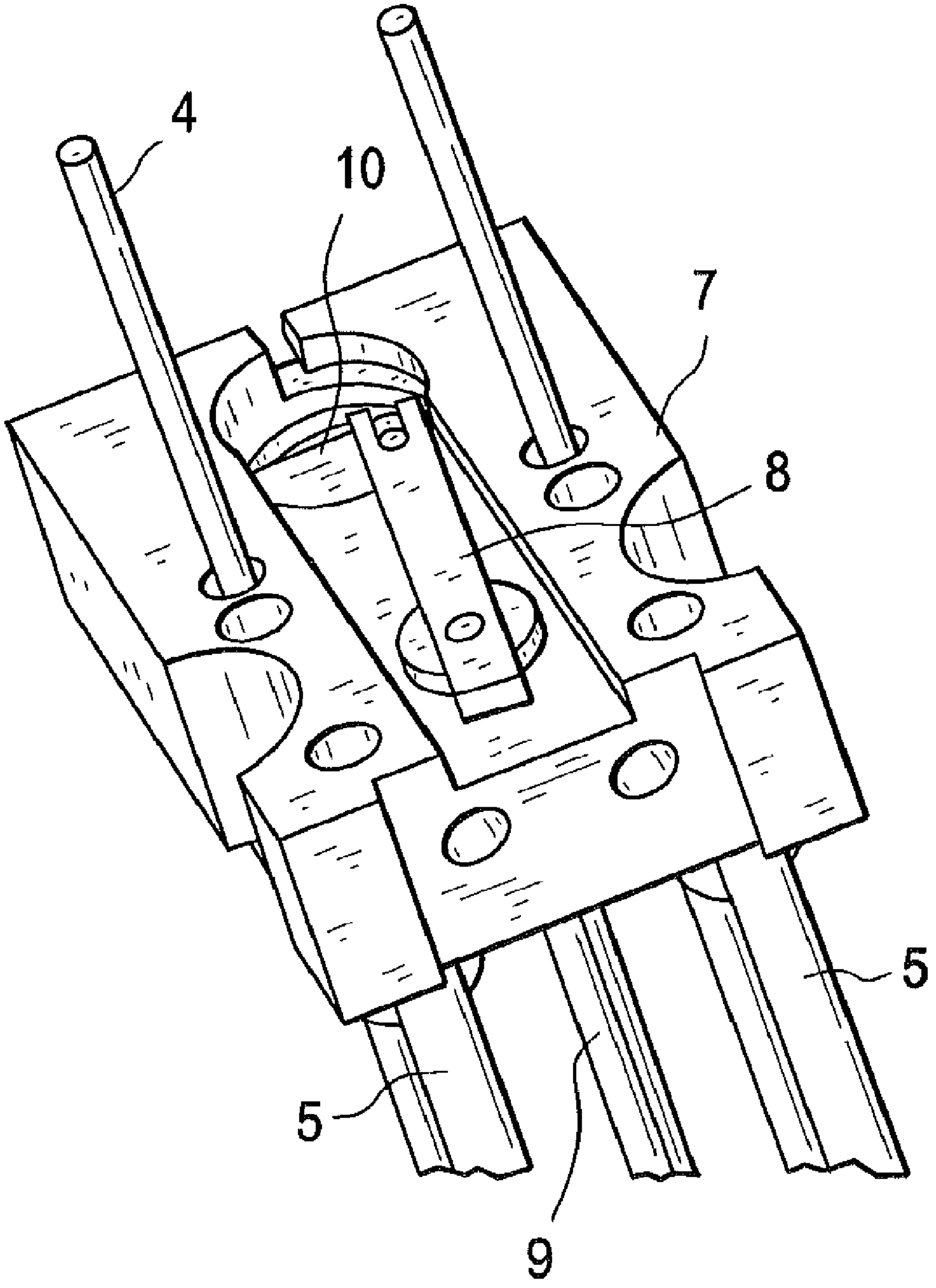
FIG. 3 depicts aspects of the brush holder assembly with a top 3D view.

Reference may now be had to FIG. 3. FIG. 3 depicts aspects of the brush holder assembly 20 with a top 3D view. As shown in FIG. 3, the brush holder assembly 20 includes a plunger 10 disposed in an opening in the body 7. The plunger 10 is coupled to the linkage 8 such that rotation of the plunger 10 causes the linkage 8 to rotate.

Figure 4:
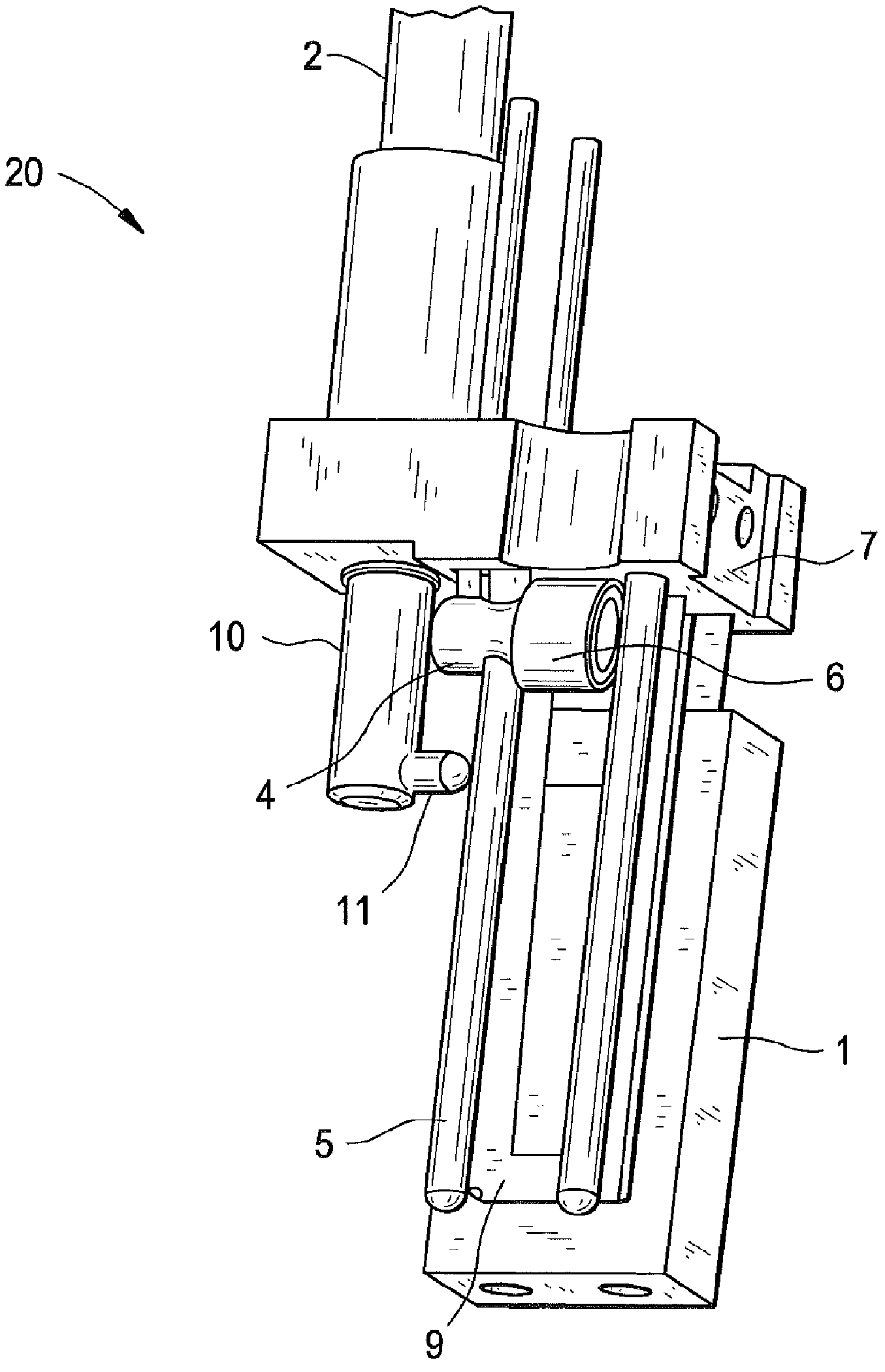
FIG. 4 depicts aspects of the brush holder assembly 20 with a side 3D view.

Reference may now be had to FIG. 4. FIG. 4 depicts aspects of the brush holder assembly 20 with a side 3D view. As shown in FIG. 4, the brush wear indicator 4 is coupled to the spring 6. Thus, as the brush 1 coupled to the spring 6 moves towards the associated collector ring 16 due to brush wear, the brush wear indicator 4 will also move. As shown in FIG. 4, a plunger pin 11 is disposed at one end of the plunger 10. The plunger 10 and the plunger pin 11 are configured to interlock with the support 3 to secure the brush holder assembly 20 in place for operation.

Figure 5:
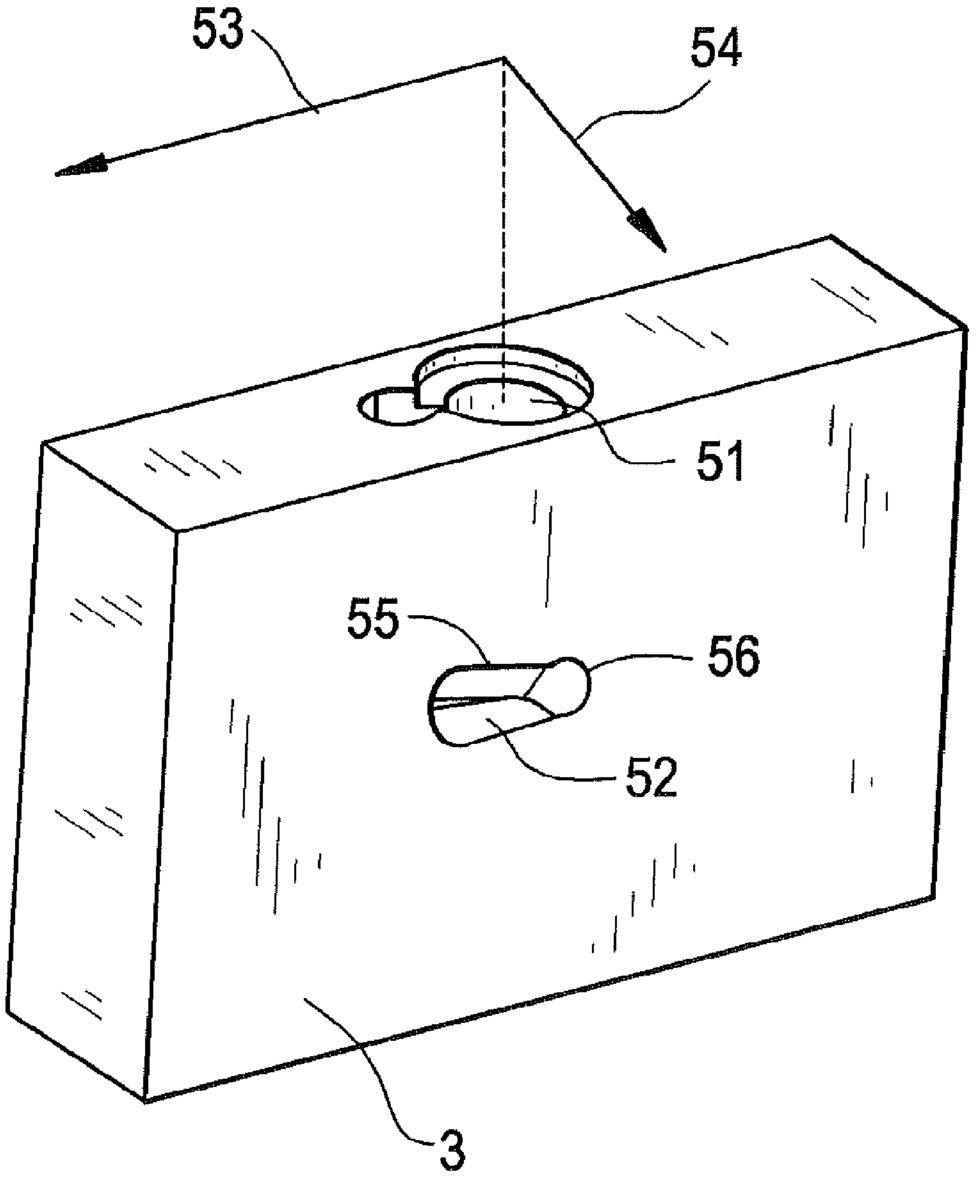
FIG. 5 depicts aspects of a support with a 3D view.

Reference may now be had to FIG. 5. FIG. 5 depicts aspects of the support 3 with a 3D view. To secure the body 7 to the support 3, the support 3 includes a first opening 51 and a second opening 52. The first opening 51 is configured to accept the plunger 10 with the plunger pin 11 in a first position 53. After the plunger 10 is inserted into the first opening 51, the plunder 10 is rotated ninety degrees to a second position 54 with the handle 2. During the rotation, the plunger pin 11 engages the second opening 52. The second opening 52 includes an angled surface 55 configured to make contact with the plunger pin 11 to pull the plunger 10 (and the body 7) to the support 3. At the second position 54, the plunger pin 11 is inserted into a notch 56 to prevent the plunger 10 from rotating back to the first position 53. Referring to FIG. 2, a lip 21 prevents the body 7 from rotating in the X-Y plane as the plunger 10 is rotated.

Figure 6:
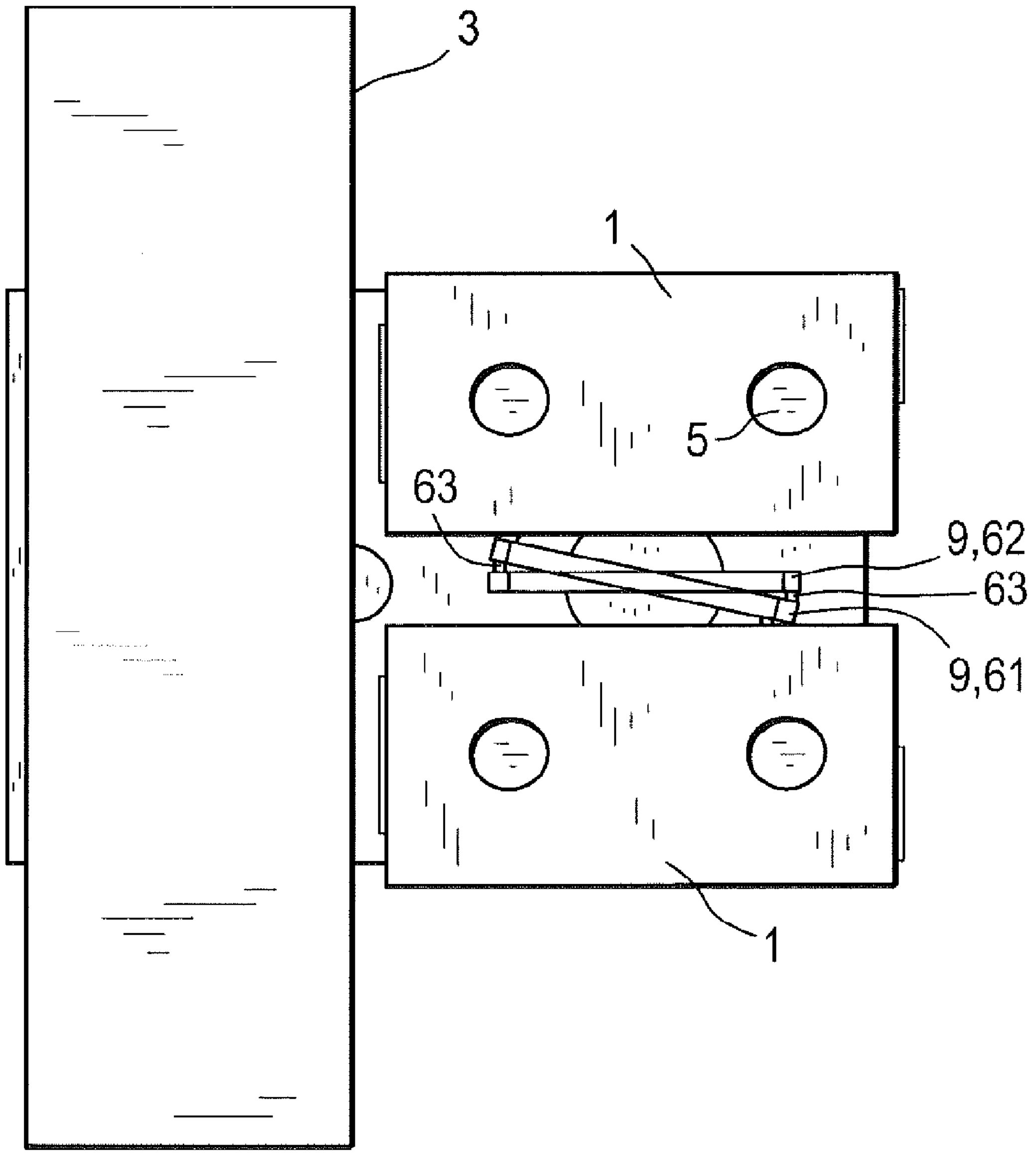
FIG. 6 illustrates a bottom view of the brush holder assembly for depicting aspects of a spring plate being used to secure brushes.

Reference may now be had to FIG. 6. FIG. 6 illustrates a bottom view of the brush holder assembly 20 for depicting aspects of the spring plate 9 being used to secure the brushes 1 to the brush holder assembly 20. The brushes 1 must be held in place whenever the brushes 1 are to be removed or replaced. To this end, when the plunger 10 is rotated ninety degrees from the second position 54 to the first position 53 to release the plunger pin 11 from the notch 56, the linkage 8 rotates the spring plate 9 from a second spring plate position 62 to a first spring plate position 61. In the first spring plate position 61, the spring plate 9 is forced against the brushes 1 holding them in place. In one embodiment, the spring plate 9 includes prongs 63 configured to be inserted slightly into the brushes 1 for securing purposes.

Figure 7:
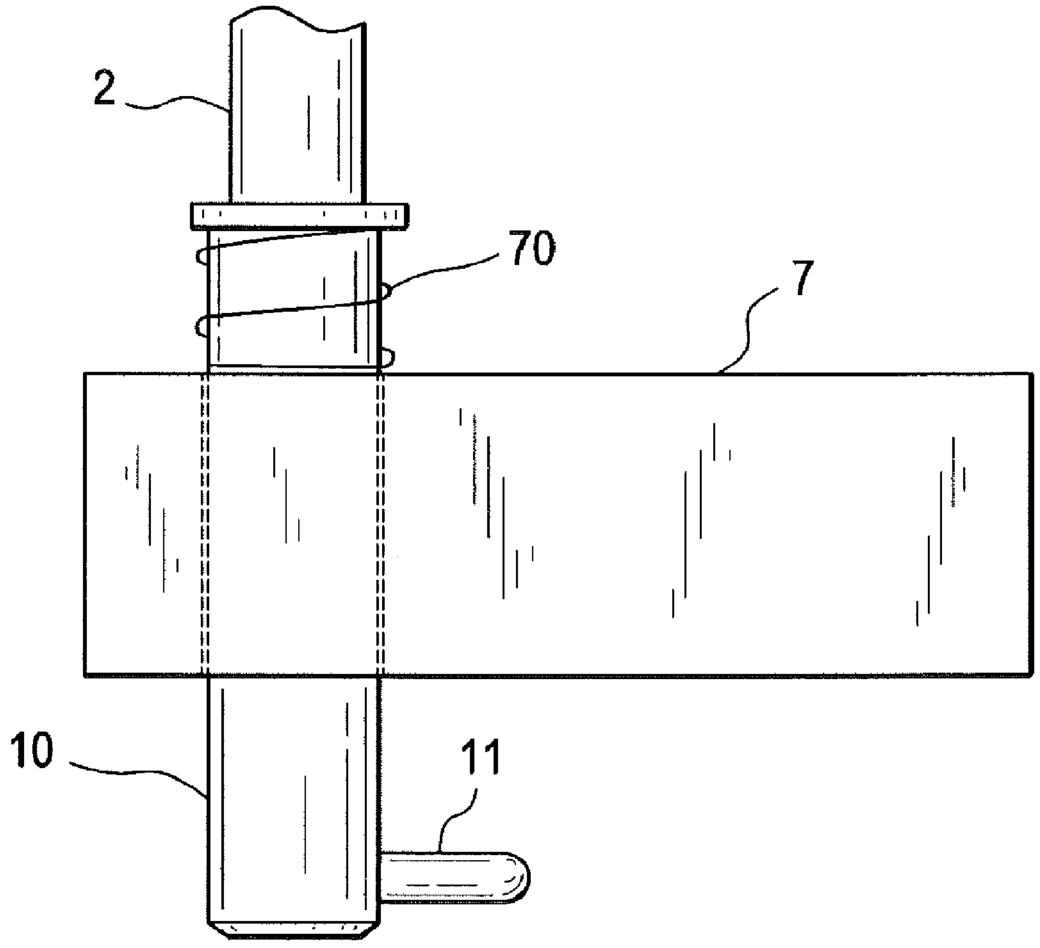
FIG. 7 depicts aspects of a plunger spring with a side view of the plunger spring and a plunger.

Reference may now be had to FIG. 7. FIG. 7 illustrates a side view of the plunger 10 inserted through the body 7. A plunger spring 70 is shown disposed around the plunger 10 between the body 7 and a surface of the plunger 10. The plunger spring 70 compresses when the plunger 10 is inserted into the support 3 and applies a force to the body 7 holding the body 7 in contact with the support 3 when the plunger 10 is in the second position 54.

Figure 8:
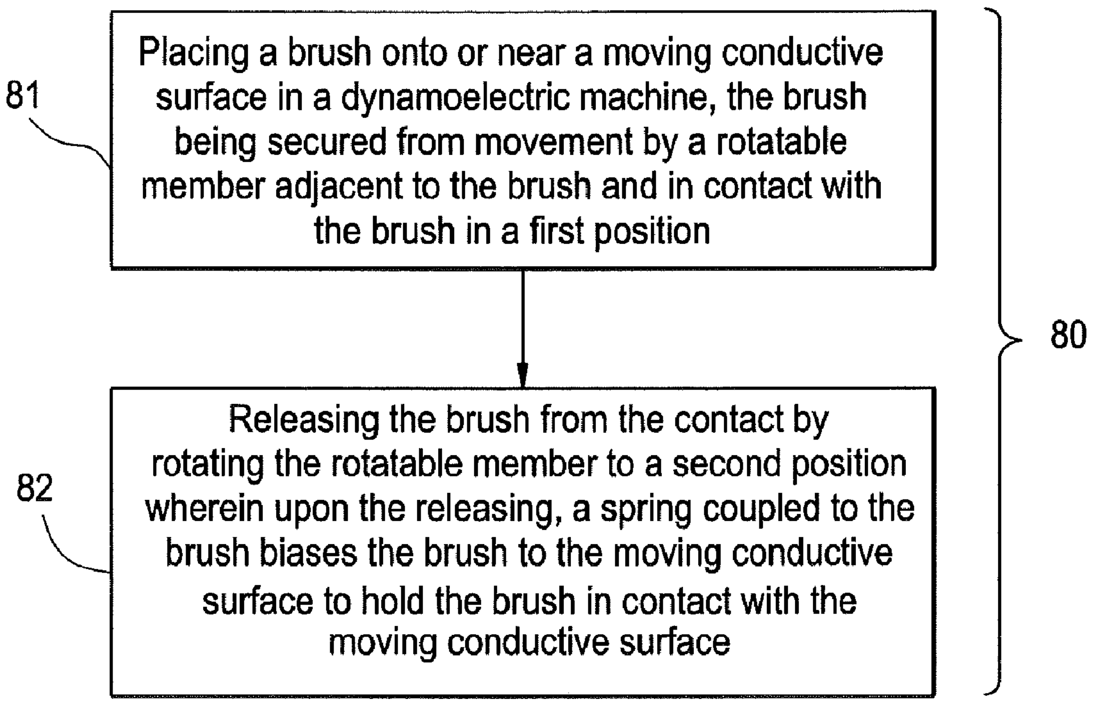
FIG. 8 presents one example of a method for holding a brush in contact with a moving conductive surface.

FIG. 8 presents one example of a method 80 for holding a brush in contact with a moving conductive surface. The method 80 calls for (step 81) placing a brush onto or near the moving conductive surface, the brush being secured from movement by a rotatable member adjacent to the brush and in contact with the brush in a first position. Further, the method 80 calls for (step 82) releasing the brush from the contact by rotating the rotatable member to a second position wherein upon the releasing, a spring coupled to the brush biases the brush to the moving conductive surface to hold the brush in contact with the moving conductive surface.

The brush holder assembly 20 has many advantages over prior art brush holders. A first advantage is the lightweight from using the pins 5 to guide the brushes 1. The lightweight allows the operator to easily lift the brush holder assembly with one hand for precise placement. A second advantage is the interlock mechanism that can quickly remove and install the brush holder assembly 20. A simple turn of the hand is all that is required to secure or release the body 7 to or from the support 3. Thus, the amount of time the operator has his hand in the energized machine 12 is reduced. A third advantage is the wear indicator 4 is part of the brush holder assembly 20 and not each individual brush, thereby, reducing replacement costs.

Other advantages of the brush holder assembly 20 relate to having the support 3 located higher than the brushes 1 (i.e., away from the brushes 1). By being located away from the brushes 1, the support 3 does not hinder air movement around the brushes 1. The unhindered air movement provides for more cooling than was possible with previous designs, which used a backplate that limited the flow of air to the brushes. In addition, having the support 3 located away from the brushes 1, allows for more brush holder assemblies 20 to be installed around the circumference of each collector ring 16 because there is more room available moving away from the center.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order. The term "couple" relates to one component being coupled either directly to another component or indirectly to the another component via one or more intermediate components.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An apparatus for holding a first brush and a second brush in contact with a moving conductive surface, the apparatus comprising:

a rotatable member disposed between the first brush and the second brush and configured to rotate about an axis parallel to a direction of guidance of the brushes towards the moving conductive surface; and a first spring coupled to the first brush and to the member and a second spring coupled to the second brush and to the member, each spring being configured to bias the associated coupled brush along the direction of guidance towards the moving conductive surface;

wherein the rotatable member in a first position makes contact with the first brush and the second brush to secure the brushes from movement and in a second position releases the brushes from the contact to allow the springs to hold the brushes in contact with the moving conductive surface.

2. The apparatus of claim 1, wherein the rotatable member comprises a first prong configured to engage the first brush and a second prong configured to engage the second brush.

3. The apparatus of claim 1, further comprising a body in communication with the first brush and the second brush.

4. The apparatus of claim 3, further comprising a first pin and a second pin secured to the body and aligned along the direction of guidance of each brush wherein the first pin is configured to be inserted into an opening in the first brush and the second pin is configured to be inserted into an opening in the second brush to enable each of the brushes to slide along the associated pin towards the moving conductive surface and to restrain each of the brushes from moving in a plane perpendicular to the associated pin.

5. The apparatus of claim 4, further comprising a support configured to be secured to a structure adjacent to the moving conductive surface and to interlock with the body to place a surface of each of the brushes in contact with the moving conductive surface.

6. The apparatus of claim 5, wherein the support comprises a first opening in a surface configured to mate with the body.

7. The apparatus of claim 6, further comprising a plunger in communication with the body and configured to be inserted into the first opening in the mating surface to interlock the body to the support.

8. The apparatus of claim 7, wherein the support comprises a second opening perpendicular to the first opening.

9. The apparatus of claim 8, further comprising a plunger pin disposed at the plunger and configured to be inserted into the first opening along with the plunger and to engage the second opening to interlock the body to the support.

10. The apparatus of claim 9, wherein the second opening comprises an angled surface configured to pull the body to the support upon the plunger pin engaging the angled surface.

11. The apparatus of claim 9, wherein the second opening comprises a notch configured to hold the plunger pin in place.

12. The apparatus of claim 9, further comprising a plunger spring disposed between a side of the body opposite of the support and a surface of the plunger and configured to be compressed and to apply a force securing the body to the support upon the plunger pin engaging the second opening.

13. The apparatus of claim 9, further comprising a linkage configured to couple the rotating member to the plunger wherein the plunger is configured to rotate from a first plunger position to a second plunger position causing the rotatable member to rotate from the first position to the second position, the first plunger position being configured for insertion of the plunger and the plunger pin into the first opening, the second plunger position being configured to have the plunger pin engage the second opening.

14. The apparatus of claim 7, further comprising a handle removably coupled to the plunger.

15. The apparatus of claim 1, further comprising a first brush wear indicator in communication with the first brush and a second brush wear indicator in communication with the second brush wherein the brush wear indicators moves as the brushes wears.

16. The apparatus of claim 15, wherein the first brush wear indicator is coupled to the first spring and the second brush wear indicator is coupled to the second spring.

17. The apparatus of claim 15, wherein each of the brush wear indicators is configured so that an end of each indicator will be flush with the body to indicate that the associated brush is worn and needs replacement.

18. A dynamoelectric machine comprising:

a conductive surface configured to move during operation of the machine;

a first brush and a second brush configured to contact the conductive surface to conduct electric current; and a brush holder configured to hold the first brush and the second brush in contact with the conductive surface, the brush holder comprising:

a rotatable member disposed between the first brush and the second brush and configured to rotate about an axis parallel to a direction of guidance of the brushes towards the moving conductive surface; and a first spring coupled to the first brush and to the member and a second spring coupled to the second brush and to the member, each spring being configured to bias the associated coupled brush along the direction of guidance towards the conductive surface;

wherein the rotatable member in a first position makes contact with the first brush and the second brush to secure the brushes from movement and in a second position releases the brushes from the contact to allow the springs to hold the brushes in contact with the conductive surface.

19. A dynamoelectric system comprising:

a dynamoelectric machine;

a conductive surface disposed at the machine and configured to move during operation of the machine;

a first brush and a second brush configured to contact the conductive surface to conduct electric current; and a brush holder configured to hold the first brush and the second brush in contact with the conductive surface, the brush holder comprising:

a rotatable member disposed between the first brush and the second brush and configured to rotate about an axis parallel to a direction of guidance of the brushes towards the moving conductive surface; and a first spring coupled to the first brush and to the member and a second spring coupled to the second brush and to the member, each spring being configured to bias the associated coupled brush along the direction of guidance towards the conductive surface;

wherein the rotatable member in a first position makes contact with the first brush and the second brush to secure the brushes from movement and in a second position releases the brushes from the contact to allow the springs to hold the brushes in contact with the conductive surface.

* * * * *